United States Patent Office 3,819,667
Patented June 25, 1974

3,819,667
HYDROXY SUBSTITUTED UNSATURATED ACIDS AND ESTERS AND DERIVATIVES THEREOF
John B. Siddall, Palo Alto, Calif., and Jean Pierre Calame, Locarno, Switzerland, assignors to Zoecon Corporation, Palo Alto, Calif.
No Drawing. Application July 22, 1969, Ser. No. 843,818, now Patent No. 3,671,558, dated June 20, 1972, which is a continuation-in-part of application Ser. No. 800,266, Feb. 18, 1969, which is a continuation-in-part of application Ser. No. 618,351, Feb. 24, 1967, which in turn is a continuation-in-part of application Ser. No. 590,195, Oct. 29, 1966, all now abandoned. Divided and this application Mar. 19, 1971, Ser. No. 126,298
Int. Cl. A01n 9/24; C07c 59/18, 69/66
U.S. Cl. 260—405
20 Claims

ABSTRACT OF THE DISCLOSURE

Aliphatic acids and esters having a backbone of at least 12 carbon atoms lower alkyl at C-3, C-7, and C-11 unsaturation at C-2,3 and substituted at C-11 or C-7,11 with hydroxy and esters and ethers thereof which are useful arthropod maturation inhibitors.

CROSS REFERENCE

This is a division of Ser. No. 843,818, filed July 22, 1969, now U.S. Pat. 3,671,558, issued June 20, 1972, which is a continuation-in-part of Ser. No. 800,266, filed Feb. 18, 1969, now abandoned, which is a continuation-in-part of Ser. No. 618,351, filed Feb. 24, 1967, now abandoned, which is a continuation-in-part of Ser. No. 590,195, filed Oct. 29, 1966, now abandoned.

INCORPORATION BY REFERENCE

Reference is hereby made to U.S. Pat. 3,671,558. All description therein is incorporated herein by reference.

SUMMARY OF INVENTION

Hydroxy substituted long chain aliphatic acids and esters are prepared by hydroxylation of a 2,10-di-unsaturated or 2,6,10-tri-unsaturated acid or ester. The hydroxy group is at position C-11 or C-7 and C-11. The hydroxy group is converted to the corresponding ether or ester. The compounds are useful as insect maturation inhibitors.

What is claimed is:
1. A compound of the following formula:

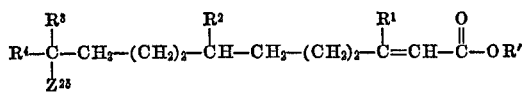

in which, $Z^{25}$ is hydroxy, acetoxy or lower alkoxy; each of $R^1$, $R^2$, $R^3$ and $R^4$ is methyl or ethyl; and R' is hydrogen or lower alkyl.

2. A compound according to Claim 1 wherein $Z^{25}$ is hydroxy and R' is lower alkyl.
3. A compound according to claim 1 wherein $Z^{25}$ is hydroxy; each of $R^1$, $R^2$, $R^3$ and $R^4$ is methyl and R' is methyl or ethyl.
4. A compound according to claim 1 wherein $Z^{25}$ is lower alkoxy and R' is lower alkyl.
5. A compound according to Claim 1 wherein $Z^{25}$ is methoxy or ethoxy.
6. A compound according to Claim 5 wherein $Z^{25}$ is ethoxy; each of $R^1$, $R^2$, $R^3$ and $R^4$ is methyl and R' is ethyl.

7. A compound according to Claim 5 wherein $Z^{25}$ is methoxy; each of $R^1$, $R^2$, $R^3$ and $R^4$ is methyl and R' is methyl.
8. A compound according to Claim 1 wherein $Z^{25}$ is acetoxy and R' is lower alkyl.
9. A compound according to claim 1 wherein $Z^{25}$ is acetoxy; R' is ethyl and each of $R^1$, $R^2$, $R^3$ and $R^4$ is methyl.
10. A compound of the following formula:

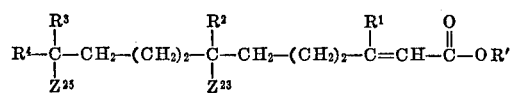

in which, R' is hydrogen or lower alkyl; each of $R^1$, $R^2$, $R^3$ and $R^4$ is methyl or ethyl; and $Z^{25}$ is hydroxy, acetoxy or lower alkoxy.

11. A compound according to Claim 10 wherein $Z^{25}$ is hydroxy and R' is lower alkyl.
12. A compound according to Claim 10 wherein $Z^{25}$ is hydroxy; each of $R^1$, $R^2$, $R^3$, and $R^4$ is methyl and R' is methyl or ethyl.
13. A compound according to Claim 10 wherein $Z^{25}$ is lower alkoxy and R' is lower alkyl.
14. A compound according to Claim 10 wherein $Z^{25}$ is methoxy or ethoxy and R' is lower alkyl.
15. A compound according to Claim 14 wherein each of $R^1$, $R^2$, $R^3$ and $R^4$ is methyl.
16. A compound according to Claim 15 wherein R' is methyl or ethyl.
17. A compound according to Claim 10 wherein $Z^{25}$ is acetoxy and R' is lower alkyl.
18. A compound according to Claim 17 wherein each of $R^1$, $R^2$, $R^3$ and $R^4$ is methyl and R' is methyl or ethyl.
19. A compound of the following formula:

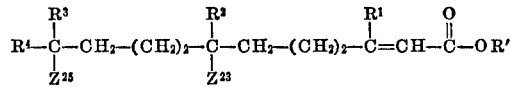

wherein each of $R^1$, $R^2$, $R^3$ and $R^4$ is methyl or ethyl; each of $Z^{23}$ and $Z^{25}$ is hydroxy, acetoxy or lower alkoxy; and R' is lower alkyl.

20. A compound according to Claim 19 wherein each of $Z^{23}$ and $Z^{25}$ is hydroxy.

References Cited
UNITED STATES PATENTS
3,429,970    2/1969    Rüegg _____ 424—333

FOREIGN PATENTS
675,262    12/1963    Canada.

OTHER REFERENCES
Bowers et al.: Life Sciences, vol. 4, pp. 2323–31 (1965).
Mikhailov et al.: Izvest. Akad. Nauk S.S.S.R., Otdel. Khim. Nauk, 1960, 935–6, May 1960.

LEWIS GOTTS, Primary Examiner
D. G. RIVERS, Assistant Examiner

U.S. Cl. X.R.
260—410.9 R, 413; 424—Dig. 12

UNITED STATES PATENT OFFICE
CERTIFICATE OF CORRECTION

Patent No. 3,819,667       Dated June 25, 1974

Inventor(s) John B. Siddall and Jean Pierre Calame

It is certified that error appears in the above-identified patent and that said Letters Patent are hereby corrected as shown below:

Claim 10, that part of the formula appearing as $$"-\underset{\underset{Z}{|}23}{\overset{\overset{R^2}{|}}{C}}-CH_2-"$$

should read $$--\underset{}{\overset{\overset{R^2}{|}}{C}}=CH---$$

Signed and sealed this 24th day of September 1974.

(SEAL)
Attest:

McCOY M. GIBSON JR.　　　　　　　C. MARSHALL DANN
Attesting Officer　　　　　　　　Commissioner of Patents